(12) United States Patent
Liang

(10) Patent No.: US 8,804,830 B2
(45) Date of Patent: Aug. 12, 2014

(54) METHOD FOR PERFORMING MOTION ESTIMATION

(75) Inventor: Zhu Liang, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 1590 days.

(21) Appl. No.: 11/692,719

(22) Filed: Mar. 28, 2007

(65) Prior Publication Data

US 2007/0195885 A1 Aug. 23, 2007

Related U.S. Application Data

(63) Continuation of application No. PCT/CN2005/001596, filed on Sep. 29, 2005.

(30) Foreign Application Priority Data

Sep. 29, 2004 (CN) .......................... 2004 1 0080394
Sep. 29, 2004 (CN) .......................... 2004 1 0080399

(51) Int. Cl.
*H04N 7/12* (2006.01)

(52) U.S. Cl.
USPC .................................................... 375/240.16

(58) Field of Classification Search
USPC ........................................ 375/240.01, 240.16
IPC ...................................................... H04N 11/02
See application file for complete search history.

(56) References Cited

U.S. PATENT DOCUMENTS

| 5,398,068 | A * | 3/1995 | Liu et al. ................. | 375/240.16 |
| 6,175,593 | B1 | 1/2001 | Kim et al. | |
| 2004/0247029 | A1 * | 12/2004 | Zhong et al. ............. | 375/240.16 |

FOREIGN PATENT DOCUMENTS

| CN | 1492687 A | 4/2004 |
| JP | 02296478 A | 12/1990 |
| JP | 2000-236552 A | 8/2000 |
| JP | 2001-028754 A | 1/2001 |
| JP | 2003-141544 A | 5/2003 |
| JP | 2004-236023 A | 8/2004 |
| WO | WO 99/53438 A2 | 10/1999 |
| WO | WO 03/021971 A1 | 3/2003 |
| WO | WO 03/063503 A1 | 7/2003 |

OTHER PUBLICATIONS

1st Office Action in corresponding Indian Application No. 1413/CHENP/2007 (Jul. 22, 2010).

(Continued)

*Primary Examiner* — Dave Czekaj
*Assistant Examiner* — Tracy Li
(74) *Attorney, Agent, or Firm* — Leydig, Voit & Mayer, Ltd.

(57) ABSTRACT

A motion estimation method includes: setting multiple block patterns and dividing respectively the current macro block into calculating blocks based on each of the block patterns; calculating respectively the motion vectors of all the calculating blocks of the current macro block in each of the block patterns; calculating respectively the sum of matching values between all the calculating blocks of the current macro block and the blocks respectively corresponding to the calculating blocks of the current macro block in each of the block patterns, acquiring the block pattern corresponding to the minimum sum, and regarding the motion vector corresponding to the acquired block pattern as the motion vector of the current macro block. Thereby, time for calculating block matching values in motion estimation may be reduced greatly and the speed of video data compression may be increased. Thus, the demand of video data in real time may be met.

8 Claims, 4 Drawing Sheets

(56) References Cited

OTHER PUBLICATIONS

1st Office Action in corresponding Japanese Application No. 2007-533856 (Mar. 9, 2010).
2nd Office Action in corresponding Japanese Application No. 2007-533856 (Aug. 3, 2010).
European Patent Office, Extended European Search Report in European Application No. 05792234.6 (Dec. 15, 2011).
Kuo et al., "A Fast Variable Block Size Motion Compensation Algorithm for H.264 Video Coding," Proceedings of the SPIE—The International Society for Optical Engineering, vol. 5241, p. 77, paragraph 2.1-p. 78, paragraph 2.2, (Sep. 8, 2003) XP002585210.
Hosur et al., "Motion Vector Field Adaptive Fast Motion Estimation," Proc. 2nd International Conference Information, Communication and Signal Processing (ICICS'1999) (Dec. 7, 1999) XP002585211.
Tourapis et al., "Highly Efficient Predictive Zonal Algorithms for Fast Block-Matching Motion Estimation," IEEE Transactions on Circuits and Systems for Video Technology, vol. 12, No. 10, (Oct. 1, 2002) XP011071884.

\* cited by examiner

METHOD FOR PERFORMING MOTION ESTIMATION

This application is a continuation of International Patent Application No. PCT/CN2005/001596, filed Sep. 29, 2005, which claims priority to Chinese Patent Application No. 200410080394.2, filed Sep. 29, 2004, and Chinese Patent Application No. 200410080399.5, filed Sep. 29, 2004, all of which are hereby incorporated by reference.

FIELD OF THE TECHNOLOGY

The present invention relates to video data compression technologies, and particularly, to a motion estimation method for video data compression.

BACKGROUND OF THE INVENTION

In multimedia applications, video data contain effective information and redundant data. Since the redundant data are useless and does not need to be transmitted and there are much redundant data in the video data, the amount of video data may be reduced greatly by compressing the redundant data in the video data, and thus it may be made very convenient to store and process the video data in real time.

In the video data, the amount of the redundant data, that is, the redundancy degree, are characterized by significant temporal correlation in structure. This is because signals of most regions of an image change very slowly in general, and especially, the background portion nearly keeps unchanged. Hence, video signals have considerable correlation between adjacent frames, that is, temporal correlation. Thus, the video data may be compressed greatly if the temporal correlation may be eliminated.

At preset, motion estimation methods are used for eliminating the temporal correlation in general, that is, for data of a current frame of an image, the previous frame is first searched for the region best matched with the data, and then a motion vector of the data of the current frame relative to the data of the previous frame is calculated and the calculated motion vector is encoded. As can be seen from the above, the key factor in the motion estimation methods is to determine a motion vector.

In practice, a block matching method is used for implementing the motion estimation methods in general. In the block matching method, each frame of image is divided into two-dimensional N N pixel sub-blocks, and in general, N is 16. On the assumption that all the pixels in a sub-block have made a same translation motion, the neighbourhood window of a sub-block in the previous frame corresponding to an N N pixel sub-block in the current frame is searched for the sub-block best matched with the N N pixel sub-block, the displacement in the two-dimensional plane between the current sub-block and the best matched sub-block in the previous frame is the motion vector obtained by means of the motion estimation.

In the block matching method, a full search method is used for searching for the best matched sub-block in general. The full search method includes: for each macro block of the current frame, calculating the block matching value at each point in a given range (the neighbourhood in general) of the previous frame, regarding a matched point corresponding to the minimum block matching value as the optimum matched point, and regarding the motion vector corresponding to the optimum matched point as the motion vector of the current macro block, wherein each point in the neighbourhood is the matched point. In general, the block matching value is the sum of the absolute values of differences between the gray values of one-to-one pixels of the macro block and the corresponding block at a matched point in the searching range, that is, the sum of the absolute differences (SAD), is used for the block matching value. The corresponding block at a matched point, that is the matched macro block, is the block the top left corner point of which is the matched point and the size of which is equal to that of the macro block. The block matching value, that is, the SAD value, is calculated by the following formula:

$$SAD(u,v) = \sum_{i=1}^{M}\sum_{j=1}^{N} |I_c(i,j) - I_r(i+u, j+v)|$$

wherein $I_c(i,j)$ denotes the gray value of a pixel in the current macro block, $I_r(i+u, j+v)$ denotes the gray value of the corresponding pixel in the matched macro block in a reference frame, herein namely the previous, and $(u,v)$ denotes the motion vector.

As can be seen from the above, in the prior art, the full search method is used to search for a best matched sub-block so as to eliminate the temporal correlation by using the block matching method of the motion estimation methods. That is, searching must be performed at each point in a given neighbourhood. Such a searching process in traversing manner results in a huge amount of calculation. For example, supposing that searching is performed in a range of 32 32 points, that is, 1024 points, of the previous frame, 1024 points are to be calculated for each macro block. Thus, the speed of video data compression is decreased greatly and cannot meet the demand of the video data in real time.

SUMMARY OF THE INVENTION

Embodiments of the present invention provide a motion estimation method so as to reduce the amount of the calculation in the motion estimation and thus improve the speed of the video data compression.

The objective of the present invention is achieved with the following technical solution.

A motion estimation method includes:

setting more than one block pattern and dividing respectively the current macro block into calculating blocks based on each of the block patterns;

calculating respectively motion vectors of all the calculating blocks of the current macro block in each of the block patterns;

calculating respectively, in each of the block patterns, the sum of matching values between all the calculating blocks of the current macro block and the blocks corresponding to their respective motion vectors, acquiring the block pattern corresponding to the minimum, and regarding the motion vector corresponding to the acquired block pattern as the motion vector of the current macro block.

The process of calculating respectively the motion vectors of all the calculating blocks of the current macro block in each of the block patterns includes:

calculating the motion vectors of all the calculating blocks of the current macro block point by point in a block pattern including the minimum calculating block.

The process of calculating respectively the motion vectors of all the calculating blocks of the current macro block in each of the block patterns includes:

acquiring the motion vectors of all the calculating blocks of the current macro block in each of other block patterns using the sum of the calculated motion vectors.

The method further includes:

verifying whether the block matching values of the minimum calculating blocks composing calculating blocks of the other block pattern have been calculated;

performing the process of acquiring the motion vectors of all the calculating blocks of the other block pattern using the sum of the calculated motion vectors of all the calculating blocks for the other block pattern if the block matching values of the minimum calculating blocks composing calculating blocks of the other block pattern have been calculated; and calculating respectively the motion vectors of all the calculating blocks of the other block pattern point by point if the block matching values of the minimum calculating blocks composing calculating blocks of the other block pattern have not been calculated.

As can be seen from the above, in accordance with the embodiments of the present invention, multiple block patterns are set and a whole macro block is divided into at least one calculating block; sum of the matching values between all the calculating blocks of the current macro block and the blocks corresponding to respective motion vectors of the calculating blocks is calculated in each of the block patterns, and the motion vector corresponding to the block pattern with the minimum sum of the matching values is used for the motion vector of the current macro block. The searching and calculating method in traversing manner in the prior art does not need to be performed, and thus, the amount of calculation in motion estimation is reduced greatly and the speed of video data compression is increased. Moreover, in accordance with the embodiments of the present invention, the block matching value of a minimum calculating block at a searching point is calculated point by point in each search, and the motion vector and the block matching value of the minimum calculating block are reserved. Thus, when the block matching value of a larger calculating block at the motion vector is calculated, it can be acquired through the simple addition operation of the reserved block matching values of the minimum calculating blocks. In this way, larger system overhead and longer calculation time due to the repeated calculations can be avoided. Therefore, under the precondition of guaranteeing the exactness and accuracy of the motion estimation, the time for calculating the block matching values in the motion estimation is further saved, and the speed of video data compression is further increased. Consequently, the demand of video data in real time is met and the satisfaction of users is improved.

EMBODIMENTS OF THE INVENTION

In order to make the technical solutions and merits of the present invention clearer, a detailed description of the present invention is hereinafter given with reference to specific embodiments and the drawings.

Embodiments of the present invention includes: setting more than one block pattern and dividing respectively the current macro block into calculating blocks based on each of the block patterns; calculating respectively the motion vectors of all the calculating blocks of the current macro block for each of the block patterns; calculating respectively the sum of matching values between all the calculating blocks of the current macro block and the blocks respectively corresponding to the calculating blocks of the current macro block in each of the block patterns, acquiring the block pattern corresponding to the minimum sum of matching values, and regarding the motion vector corresponding to the acquired block pattern as the motion vector of the current macro block. The following two methods may be used for calculating respectively the motion vectors of all the calculating blocks of the current macro block in each of the block patterns.

Method 1. Calculate the motion vectors of the all the calculating blocks point by point in each of the block patterns.

Method 2. Calculate the motion vectors of all the calculating blocks point by point in the block pattern including a minimum calculating block, and acquiring the motion vectors of all the calculating blocks in other block patterns using the sum of the calculated motion vectors.

A diamond search mode may be used for performing the point by point calculation process in both the above methods.

Preferably, in the embodiments in accordance with the present invention, four block patterns, including one whole macro block, two transverse sub-blocks, two longitudinal sub-blocks, and four sub-blocks, may be set.

Two specific embodiments are hereinafter used to describe the detailed implementation processes of the present invention for the above Methods 1 and 2, respectively.

In the following embodiments, the set block patterns include the above four block patterns and the size of the macro block is 16 16 pixels.

Figure 1:
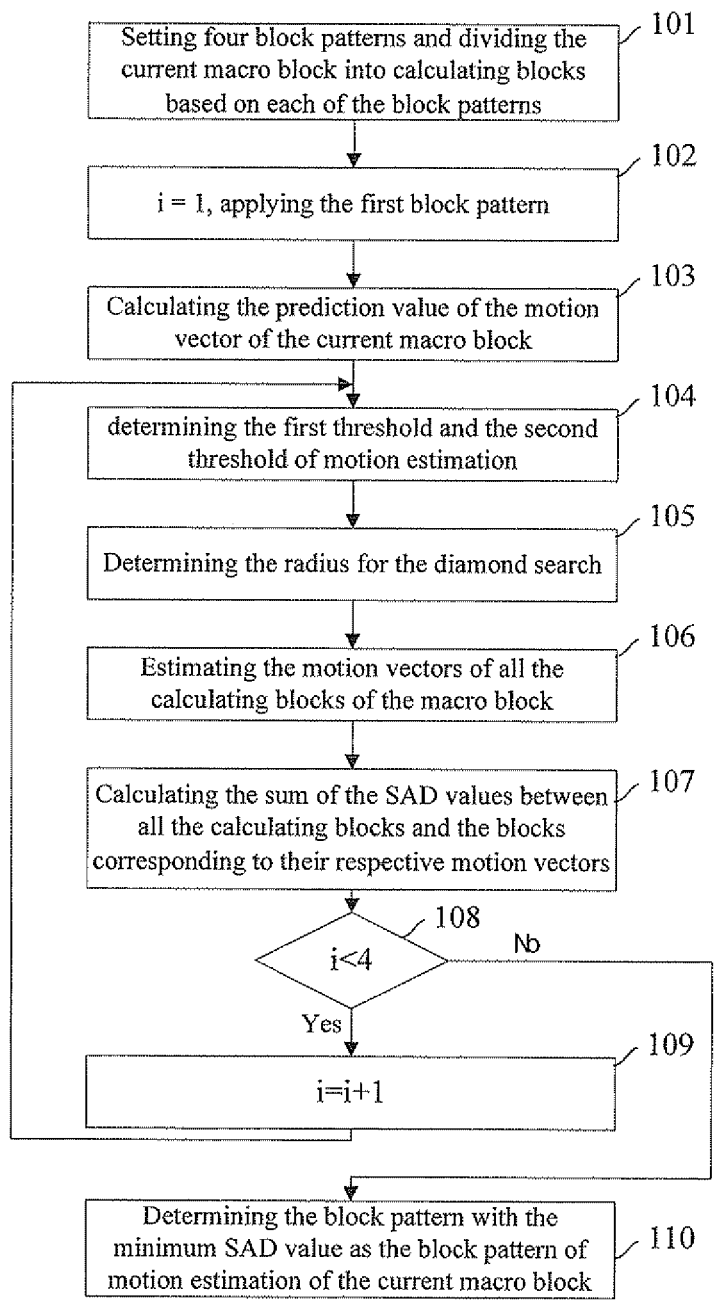
FIG. 1 shows the flow chart in accordance with an embodiment of the present invention.

FIG. 1 shows the flow chart in accordance with an embodiment of the present invention. As shown in FIG. 1, the process of motion estimation in accordance with the embodiment of the present invention specifically includes the steps as follows.

Step 101: setting four block patterns and dividing the current macro block into calculating blocks based on each of the block patterns.

The first block pattern to the fourth block pattern, that is, one whole macro block, two transverse sub-blocks, two longitudinal sub-blocks, and four sub-blocks, are set. As shown in FIGS. 3A to 3D, the calculating blocks acquired by dividing based on the four block patterns are as follows:

one 16 16 calculating block acquired by dividing the current macro block based on the first block pattern;

two 16 8 calculating blocks acquired by dividing the current macro block based on the second block pattern;

two 8 16 calculating blocks acquired by dividing the current macro block based on the third block pattern;

and four 8 8 calculating blocks acquired by dividing the current macro block based on the fourth block pattern, respectively.

Step 102: assigning a variable i=1, and applying the first block pattern to the current macro block.

The variable i in this step is used for recording the current block pattern so as to determine a used block pattern and an unused block pattern based on the value of the variable i.

Step 103: acquiring the prediction value of the motion vector of the current macro block.

The prediction value of the motion vector of the current macro block in this step is the median of the motion vectors of the left macro block, the top macro block and the top-right macro block of the current macro block, that is, the horizontal component of the prediction value is the middle value of the horizontal components of the three motion vectors and the vertical component of the prediction value is the middle value of the vertical components of the three motion vectors. The left block, the top block, the top-right block of the current macro block in the current frame are denoted as W1, W2, and W3, respectively, and thus, the prediction value of the motion vector of the current macro block is Median (W1, W2, W3). W1 is set to (0, 0) if there is no macro block to the left of the current macro block; W2 is set to (0, 0) if there is no macro block to the top of the current macro block; and W3 is set to (0, 0) if there is no macro block to the top-right of the current macro block.

Moreover, the motion vector of the block most adjacent to the current macro block is acquired as the prediction value of the motion vector of the current macro block if the block pattern of the left macro block, the top macro bloc or the top-right macro block of the current macro block is not the first block pattern. If there axe two blocks most adjacent to the current macro block, the average value of the motion vectors of the two blocks most adjacent to the current macro block is acquired as the prediction value of the motion vector of the current macro block, that is, the horizontal components of the two motion vectors and the vertical components of the two motion vectors are averaged, respectively.

Step 104: determining a first threshold and a second threshold of motion estimation based on the current block mode and the block matching values, that is, SAD values, between the current macro block and the adjacent macro blocks.

In this step, the specific implementation process of determining the first threshold and the second threshold of motion estimation includes the steps as follows:

(1) determining the abscissa x and the ordinate y of the top-left corner pixel of the calculating block and determining the width w of the calculating block of the current block pattern;

(2) if x is 0 and y is 0, the first threshold is 512 and the second threshold is 1024 in the case that the current block pattern is the first block pattern, the first threshold is 256 and the second threshold is 512 in the case that the current block pattern is the second or third block pattern, and the first threshold is 128 and the second threshold is 256 in the case that the current block pattern is the fourth block pattern;

if both x and y are not 0, a. in the case that the current block pattern is the first block pattern, calculating the sum SAD1 of the block matching values between the calculating block and the four blocks corresponding to the points (x−2,y), (x−1,y), (x−2,y+1) and (x−1,y+1), the sum SA2 of the block matching values between the calculating block and the four blocks corresponding to the points (x,y−2), (x+1,y−2), (x,y+1) and (x+1,y−1), and the sum SAD3 of the block matching values between the calculating block and the four blocks corresponding to the points (x+w,y−2), (x+w+1,y−2), (x+w,y−1) and (x+w+1,y−1); setting the first threshold to be the minimum of SAD1, SAD2 and SAD3, and setting the second threshold to be the first threshold plus 128; moreover, setting the first threshold to be 512 if the first threshold is less than 512, setting the first threshold to be 1024 if the first threshold is more than 1024, and setting the second threshold to be 1792 if the second threshold is more than 1792;

b. in the case that the current block pattern is the second block pattern, calculating the sum SAD1 of the block matching values between the calculating block and the two blocks corresponding to the points (x−2,y) and (x−1,y), the sum SAD2 of the block matching values between the calculating block and the two blocks corresponding to the points (x,y−1) and (x+1,y−1), and the sum SAD3 of the block matching values between the calculating block and the two blocks corresponding to the points (x+w,y−1) and (x+w+1,y−1); setting the first threshold to be the minimum of SAD1, SAD2 and SAD3, and setting the second threshold to be the first threshold plus 128; moreover, setting the first threshold to be 256 if the first threshold is less than 256, setting the first threshold to be 512 if the first threshold is more than 512, and setting the second threshold to be 896 if the second threshold is more than 896;

c. in the case that the current block pattern is the third block pattern, calculating the sum SAD1 of the block matching values between the calculating block and the two blocks corresponding to the points (x−1,y) and (x−1,y+1), the sum SAD2 of the block matching values between the calculating block and the two blocks corresponding to the points (x,y−2) and (x,y−1), and the sum SAD3 of the block matching values between the calculating block and the two blocks corresponding to the points (x+w,y−2) and (x+w,y−1); setting the first threshold to be the minimum of SAD1, SAD2 and SAD3, and setting the second threshold to be the first threshold plus 128; moreover, setting the first threshold to be 256 if the first threshold is less than 256, setting the first threshold to be 512 if the first threshold is more than 512, and setting the second threshold to be 896 if the second threshold is more than 896;

d. in the case that the current block pattern is the fourth block pattern, calculating the block matching value SAD1 between the calculating block and the block corresponding to the point (x−1,y), the block matching value SAD2 between the calculating block and the block corresponding to the point (x,y−1), and the block matching value SAD3 between the calculating block and the block corresponding to the point (x+w,y); setting the first threshold to be the minimum of SAD1, SAD2 and SAD3, and setting the second threshold to be the first threshold plus 64; moreover, setting the first threshold to be 128 if the first threshold is less than 128, setting the first threshold to be 256 if the first threshold is more than 256, and setting the second threshold to be 448 if the second threshold is more than 448.

Step 105: determining the radius used in the diamond search mode.

In this step, if the following three conditions are satisfied:

a. the motion vectors of the left macro block, the top macro block and the top-right macro block of the current macro block are the same;

b. the motion vector of the block in the previous frame at the current location is not 0;

c. the second threshold is less than a block motion threshold, determining the radius for the diamond search to be 1; otherwise, determining the radius for the diamond search to be 2.

In addition, it should be noted that the block motion threshold in this step is a value evaluating the size of the motion range of the current macro block and may be set to be 384 in accordance with the embodiment of the present invention. However, the present invention does not exclude other appropriate block motion thresholds.

Step 106: estimating respectively the motion vectors of all the calculating blocks of the current macro block based on the determined radius and using the diamond search method till the exit condition is satisfied, and regarding the motion vectors corresponding to the optimum matching points as the motion vectors of the corresponding calculating blocks.

Step 107: calculating the block matching value, SAD value, of the current macro block for the current block pattern, that is, the sum of the SAD values between all the calculating blocks of the current macro block and the blocks corresponding to their respective optimum matching points in the previous frame.

In this step, in the case that the current block pattern is the first block pattern, the SAD value of the current block pattern is the SAD value between the 16 16 pixel calculating block and the block corresponding to the optimum matching point of the 16 16 pixel calculating block;

in the case that the current block pattern is the second block pattern, the SAD value of the current block pattern is the sum of the SAD values between the two 16 8 pixel calculating blocks and the blocks corresponding to their respective optimum matching point;

in the case that the current block pattern is the third block pattern, the SAD value of the current block pattern is the sum of the SAD values between the two 8 16 pixel calculating blocks and the blocks corresponding to their respective optimum matching point;

in the case that the current block pattern is the fourth block pattern, the SAD value of the current block pattern is the sum of the SAD values between the four 8 8 pixel calculating blocks and the blocks corresponding to their respective optimum matching point.

Step 108: verifying whether the value of the variable i is less than 4, and performing Step 109 if yes; otherwise, performing Step 110 directly.

Step 109: assigning the variable i=i+1, applying the $i^{th}$ block pattern to the current macro block, and cycling back to Step 104.

Step 110: comparing the SAD values of the current macro block in the four block patterns with each other, acquiring the block pattern corresponding to the minimum SAD value, that is, the minimum sum value, of the current macro block, and regarding the motion vector corresponding to the acquired block pattern as the motion vector of the current macro block.

One 16 16 pixel calculating block of the current macro block has one motion vector if the SAD value of the current macro block in the first block pattern is minimal.

Two 16 8 pixel calculating blocks of the current macro block have their respective motion vectors if the SAD value of the current macro block in the second block pattern is minimal.

Two 8 16 pixel calculating blocks of the current macro block have their respective motion vectors if the SAD value of the current macro block in the third block pattern is minimal.

Four 8 8 pixel calculating blocks of the current macro block have their respective motion vectors if the SAD value of the current macro block in the fourth block pattern is minimal.

Figure 2:
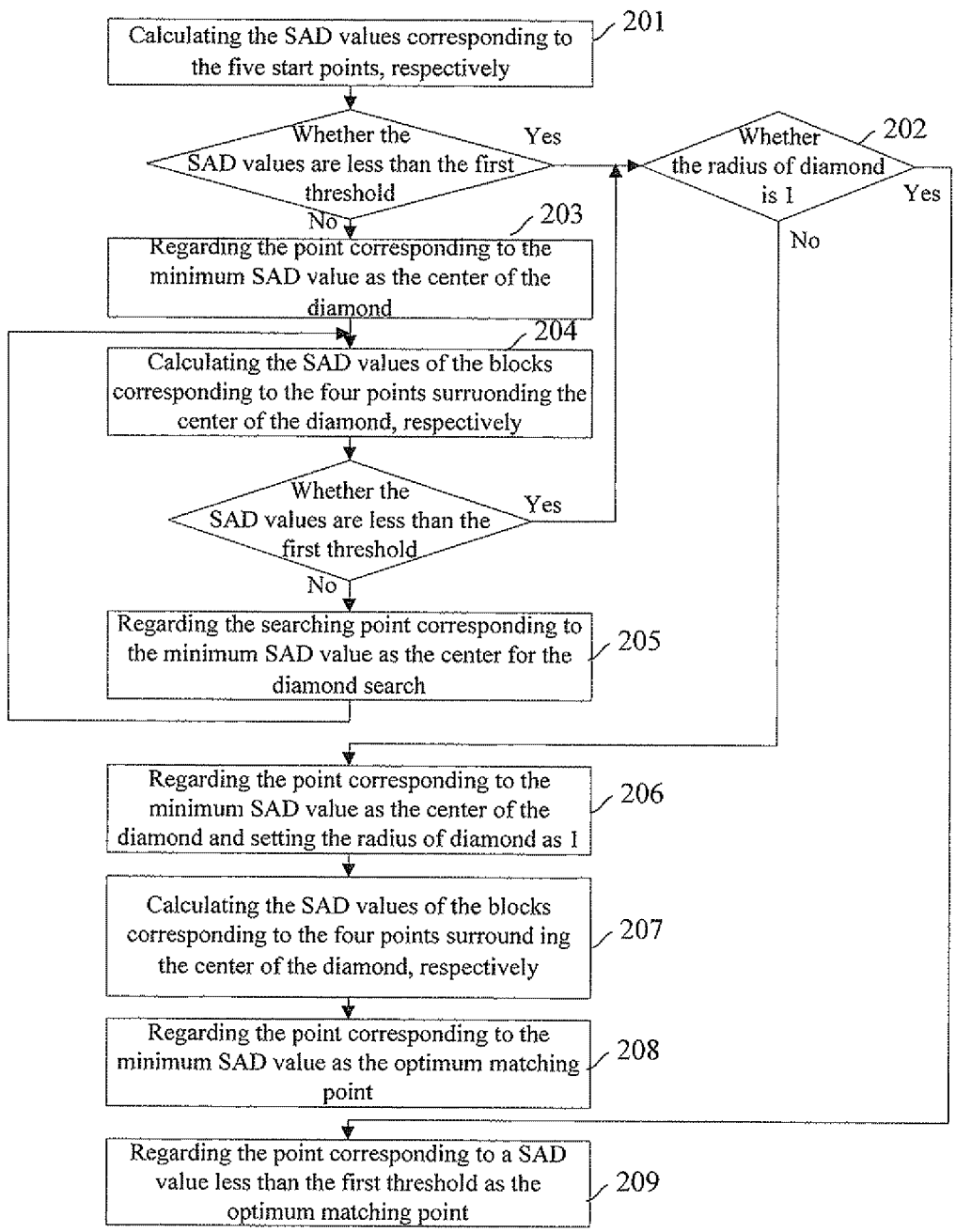
FIG. 2 shows the flow chart of a diamond search mode adopted in the embodiment of the present invention.

As shown in FIG. 2, the process of estimating the motion vector of the calculating block using the diamond search method, that is, finding the optimum matching point of the current calculating block, in Step 106 shown in FIG. 1, specifically includes the steps as follows.

Step 201: acquiring the start point of the diamond search for the current calculating block.

In this step, the motion vectors of the left block, the top block and the top-right block of the current calculating block in the current frame are denoted as V1, V2 and V3, respectively. The block in the previous frame, the location of which is the same as that of the current calculating block, is referred to as the same location block, the motion vector (0, 0) is used to describe the location of the same location block, and the actual motion vector of the current calculating block is denoted as V4. Calculating the SAD values between the current calculating block and the blocks corresponding to (0, 0), V1, V2, V3 and V4, respectively, and selecting the point corresponding to the minimum SAD value of the SAD values as the start point for the searching. It should be noted that in this step, V1 is not to be calculated if there is no calculating block to the left of the current calculating block; V2 is not to be calculated if there is no calculating block to the top of the current calculating block; V3 is not to be calculated if there is no calculating block to the top-right of the current calculating block; V4 is not to be calculated if the current frame is the first frame of this group of images.

In this step, continuing to Step 202 of the SAD values are less than the first threshold; otherwise, proceeding to Step 203.

Step 202: verifying whether a radius of diamond for this searching is 1, and proceeding to Step 209 if yes; otherwise, proceeding to Step 206.

Step 203: regarding the start point for the searching acquired in Step 201 as the center of the diamond.

Step 204: determining, based on the determined radius of diamond, the four point surrounding the diamond, that is, the four points to the top, bottom, left and right of the center of the diamond, with the distance of the radius of diamond from the center of the diamond, and calculating the SAD values between the current calculating block and the blocks corresponding to the four points, respectively.

In this step, cycling back to Step 202 if the SAD values are less than the first threshold; otherwise, continuing to Step 205.

Step 205: regarding the point among the four points determined in Step 204 corresponding to the minimum SAD value of block as the center for the next diamond search, and cycling back to Step 204 to continue the diamond search.

Step 206: setting the radius of the current diamond as 1 and regarding the point corresponding to the SAD value less than the first threshold as a center point for the searching.

Step 207: calculating the SAD values between the calculating block and the blocks corresponding to the four surrounding points, respectively.

Step 208: regarding the point corresponding to the minimum SAD value calculated as the optimum matching point, and terminating this procedure.

Step 209: regarding the point corresponding to the SAD value less than the first threshold as the optimum matching point.

Figures 3A, 3B:
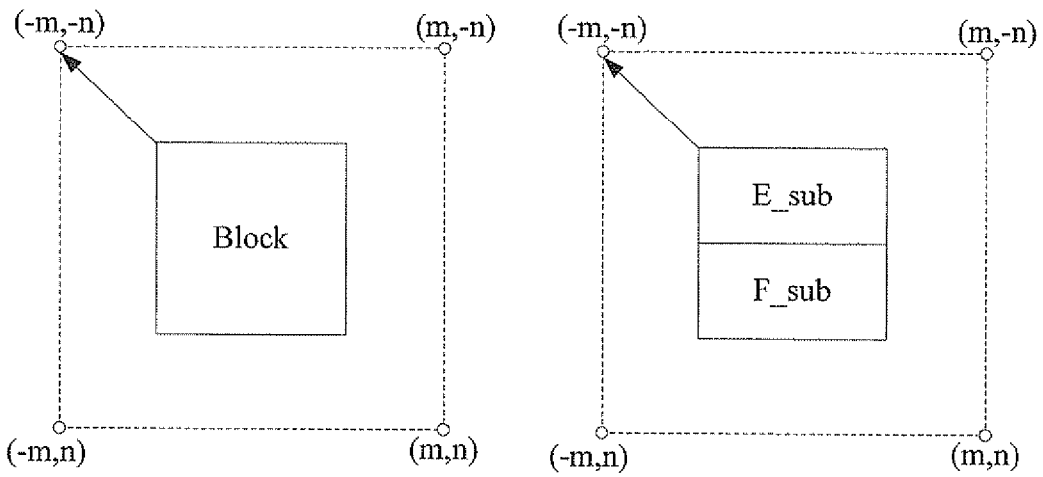
FIG. 3A shows the schematic diagram illustrating the calculating blocks acquired by dividing the macro block based on the first block pattern in accordance with the embodiment of the present invention.
FIG. 3B shows the schematic diagram illustrating the calculating blocks acquired by dividing the macro block based on the second block pattern in accordance with the embodiment of the present invention.

As shown in FIG. 3A, in accordance with another embodiment of the present invention, a calculating block acquired by dividing a macro block based on the first block pattern is a macro block. Block in FIG. 3A denotes an macro block of an image, its size is 16 16 pixels, the coordinates of the top-left corner of the macro block is denoted as (x,y), and in the case of the motion vector (u,v), the neighbourhood $-m \le u \le m$, $-n \le v \le n$ is to be searched for the motion vector of the current macro block.

Figures 3C, 3D:
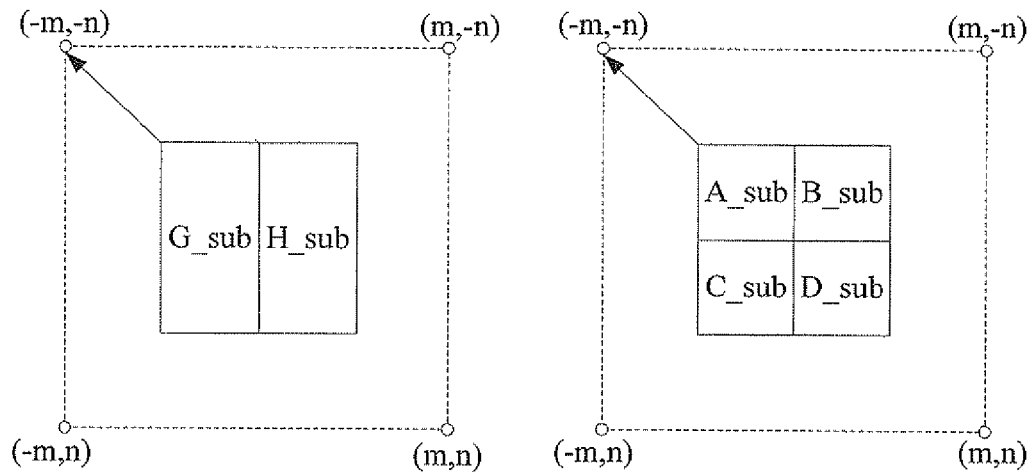
FIG. 3C shows the schematic diagram illustrating the calculating blocks acquired by dividing the macro block based on the third block pattern in accordance with the embodiment of the present invention.
FIG. 3D shows the schematic diagram illustrating the calculating blocks acquired by dividing the macro block based on the fourth block pattern in accordance with the embodiment of the present invention.
Figure 4:
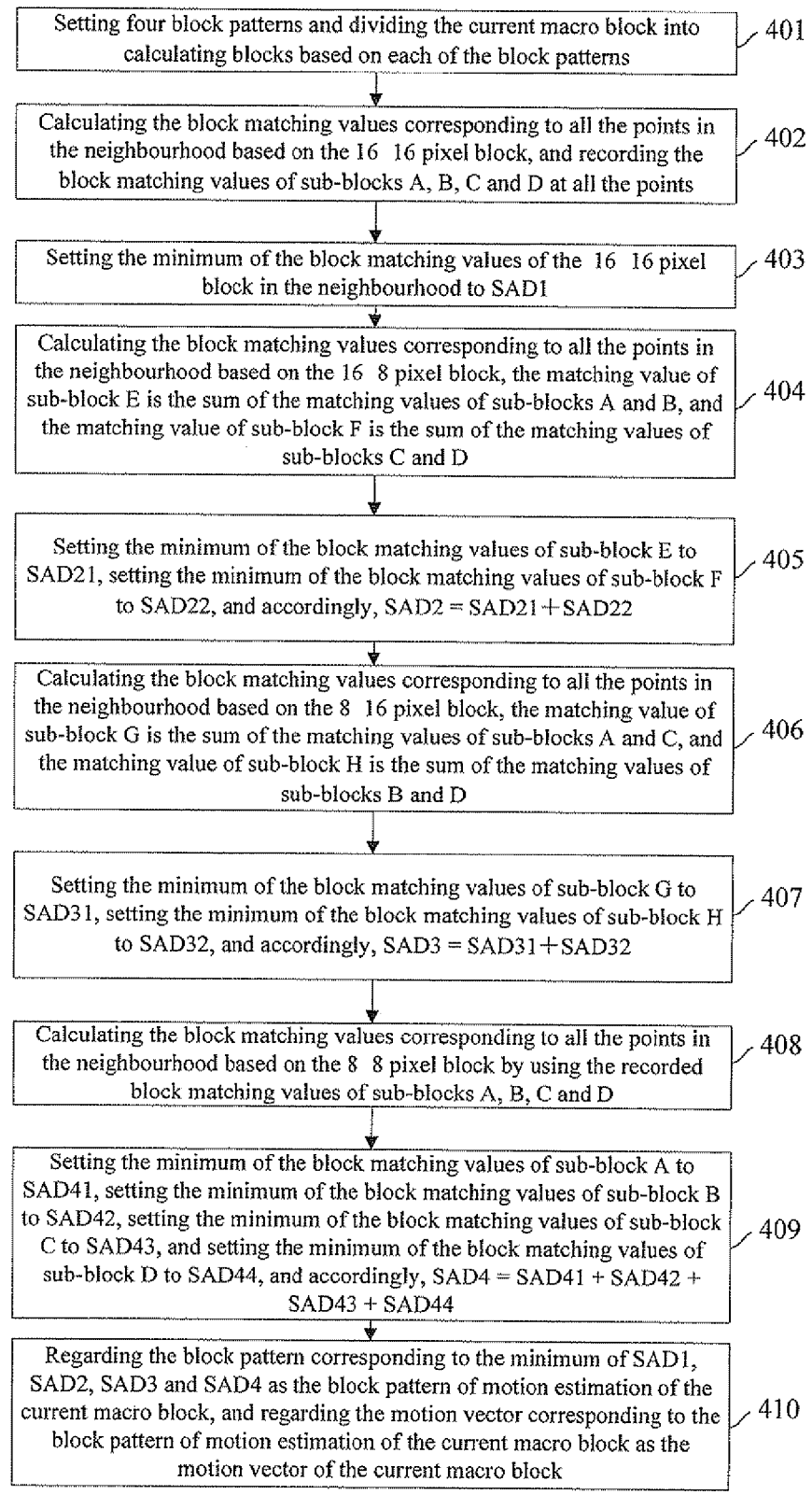
FIG. 4 shows the flow chart of another embodiment of the present invention.

FIG. 4 shows the flow chart in accordance with the present embodiment. Refer to FIGS. 3A to 3D and FIG. 4. The process of motion estimation in accordance with the present embodiment specifically includes the steps as follows.

Step 401: setting four block patterns and dividing the current macro block into calculating blocks based on each of the block patterns.

In this step, the first block pattern to the fourth block pattern, that is, one whole macro block, two transverse sub-blocks, two longitudinal sub-blocks and four sub-blocks, are set. As shown in FIGS. 3A to 3D, the calculating blocks acquired by dividing the macro block based on the four block patterns are as follows respectively:

one 16 16 calculating block acquired by dividing the macro block based on the first block pattern, two 16 8 calculating blocks acquired by dividing the macro block based on the second block pattern, two 8 16 calculating blocks acquired by dividing the macro block based on the third block pattern, and four 8 8 calculating blocks acquired by dividing the macro block based on the fourth block pattern, respectively.

Step 402: calculating the block matching values based on the 16 16 pixel block in the case of the motion vector (u,v) and the neighbourhood $-m \le u \le m$, $-n \le v \le n$. The locations of the four sub-blocks are shown in FIG. 3D as follows:

sub-block A is an 8 8 pixel sub-block with the coordinates (x,y) at the top-left corner, sub-block B is an 8 8 pixel sub-block with the coordinates (x+8, y) at the top-left corner, sub-block C is an the 8 8 pixel sub-block with the coordinates (x,y+8) at the top-left corner, and sub-block D is an 8 8 pixel sub-block with the coordinates (x+8, y+8) at the top-left corner.

For each motion vector in the neighbourhood, block matching values of the four 8 8 pixel sub-blocks are recorded as follows:

the block matching value SAD_A(u, v) of sub-block A in the case of the motion vector (u,v), the block matching value SAD_B(u, v) of sub-block B in the case of the motion vector (u,v), the block matching value SAD_C(u, v) of sub-block C in the case of the motion vector (u,v), and the block matching value SAD_D(u, v) of sub-block D in the case of the motion vector (u,v), respectively.

In this step, it should be noted that the motion vectors of all the calculating blocks of the fourth block pattern are first calculated point by point because a calculating block in the fourth block pattern is less than those in other block patterns. The detailed calculation method may be implemented by adapting the diamond search method shown in FIG. 2.

Step 403: setting the minimum of the block matching values based on the 16 16 pixel block in the neighbourhood $-m \le u \le m$, $-n \le v \le n$ to SAD1.

Step 404: calculating the block matching values based on the 16 8 pixel block in the case of the motion vectors (u,v) and the neighborhood $-m \le u \le m$, $-n \le v \le n$. As shown in FIG. 3B, two sub-blocks of the macro block are as follows:

sub-block E that is the 16 8 pixel sub-block with the coordinates (x,y) at the top-left corner, and sub-block F that is the 16 8 pixel sub-block with the coordinates (x, y+8) at the top-left corner, respectively.

For each motion vector in this neighbourhood, the block matching value of sub-block E in case of the motion vector (u,v) is the sum of the block matching values of sub-blocks A and B in the case of the motion vector (u,v), namely SAD_A (u, v)+SAD_B(u, v), and the block matching value of sub-block F in the case of the motion vector (u,v) is the sum of the block matching values of sub-blocks C and D in the case of the motion vector (u,v), namely SAD_C(u, v)+SAD_D(u, v).

Step 405: setting the minimum of the block matching values of sub-block E in this neighbourhood as SAD21, setting the minimum of the block matching values of sub-block F in the neighbourhood $-m \le u \le m$, $-n \le v \le n$ to SAD22, and accordingly, SAD2=SAD21+SAD22.

Step 406: calculating the block matching values based on the 8 16 pixel block in the case of the motion vector (u,v) and the neighbourhood $-m \le u \le m$, $-n \le v \le n$. As shown in FIG. 3C, two sub-blocks of the macro block are, sub-block G that is the 8 16 pixel sub-block with the coordinates (x,y) at the top-left corner, and sub-block H that is the 8 16 pixel sub-block with the coordinates (x+8, y) at the top-left corner, respectively.

For each motion vector in this neighbourhood, the block matching value of sub-block G in the case of the motion vector (u,v) is the sum of the block matching values of sub-blocks A and C in the case of the motion vector (u,v), namely SAD_A(u, v)+SAD_C(u, v), and the block matching value of sub-block H in the case of the motion vector (u,v) is the sum of the block matching values of sub-blocks B and D in the case of the motion vector (u,v), namely SAD_B(u, v)+SAD_D(u, v).

Step 407: setting the minimum of the block matching values of sub-block G in the neighbourhood to SAD31, setting the minimum of the block matching values of sub-block H in the neighbourhood to SAD32, and accordingly, SAD3=SAD31+SAD32.

Step 408: calculating the block matching values based on the 8 8 pixel block in the case of the motion vector (u,v) and the neighbourhood $-m \le u \le m$, $-n \le v \le n$. Four sub-blocks of the macro block are sub-block A, sub-block B, sub-block C and sub-block D, and the block matching values of the four sub-blocks at all the motion vectors in the neighbourhood, which have already been recorded in Step 201, includes:

the block matching value SAD_A(u, v) of sub-block A in the case of the motion vector (u,v), the block matching value SAD_B(u, v) of sub-block B in the case of the motion vector (u,v), the block matching value SAD_C(u, v) of sub-block C in the case of the motion vector (u,v), the block matching value SAD_D(u, v) of sub-block D in the case of the motion vector (u,v).

Step 409: setting the minimum of the block matching values of sub-block A in the neighbourhood to SAD41, setting the minimum of the block matching values of sub-block B in the neighbourhood to SAD42, setting the minimum of the block matching values of Sub-block C in the neighbourhood to SAD43, setting the minimum of the block matching values of Sub-block D in the neighbourhood to SAD44, and accordingly, SAD4=SAD41+SAD42+SAD43+SAD44.

Step 410: regarding the block pattern corresponding to the minimum of SAD1, SAD2, SAD3 and SAD4 as the block pattern for motion estimation of the current macro block, and regarding the motion vector corresponding to the block pattern for motion estimation of the current macro block as the motion vector of the current macro block.

In this embodiment, the full search method is taken for the example. However, the present invention is not limited to the full search and is applicable to any searching method, such as the three step search, the diamond search. If only the block matching values of minimum calculating blocks at each motion vector are recorded first, these block matching values may be used in the subsequent searching steps, aid only simple addition operation is needed.

However, during motion estimation, the block matching value at a new searching point (motion vector) or an interpolation point may need to be calculated and the corresponding block matching values have not been recorded in the previous searching steps. Thus, the recorded block matching values cannot be used and the block matching value of the calculating block needs to be newly calculated point by point. Therefore, before calculating the block matching value of a calculating block at a searching point at a time, a step may be added: verifying whether there are the block matching values of the sub-blocks composing the calculating block at the searching point in the record, acquiring the block matching value of the calculating block by adding the block matching values of the sub-blocks composing the calculating block if yes, and otherwise, calculating point by point the motion vector of the calculating block at the searching point using the diamond search method as shown in FIG. 2.

Moreover, the motion estimation is begun with the 16 16 pixel block pattern in the above embodiments. Since the searching area of this block pattern is large in general, the recorded block matching values can be used more when the block matching values of the calculating block of other block patterns are calculated. However, the present invention does not exclude the embodiment in which the notion estimation is begun with the 8 8 pixel block pattern.

In the above embodiments of the present invention, the set four block patterns include one whole macro block, two transverse sub-blocks, two longitudinal sub-blocks, and four sub-blocks. However, in other embodiments of the present invention, there may be combination of the four block patterns, such as two transverse sub-blocks and two longitudinal sub-blocks, or there may be other block patterns, and the principles of the detailed implementation of the present invention are the same as the process in the above embodiments.

To sum up, the foregoing is only preferred embodiments of the present invention and is not for use in limiting the protection scope thereof. Any modification, equivalent replacement or improvement made under the spirit and principles of the present invention is included in the protection scope of the claims of the present invention.

What is claimed is:

1. A motion estimation method, comprising:
setting a plurality of block patterns;
for each of the plurality of set block patterns:
dividing a current macro block into calculating blocks based on each of the plurality of the set block patterns;
calculating motion vectors of all the calculating blocks of the current macro block; and
calculating the sum of matching values between all the calculating blocks of the current macro block and calculating blocks corresponding to their respective motion vectors; and
selecting, from the plurality of set block patterns, the block pattern corresponding to the minimum out of the sums of matching values corresponding to each of the plurality of the set block patterns, and regarding a motion vector corresponding to the selected block pattern as the motion vector of the current macro block;
wherein calculating the motion vectors of all the calculating blocks of the current macro block comprises calculating the motion vectors of all the calculating blocks of the current macro block point by point;
wherein calculating the motion vectors of one of the calculating blocks point by point comprises:
determining a start point for a diamond search and regarding the determined start point as the center of the diamond search;
for the one calculating block, calculating respectively matching values between the one calculating block and calculating blocks corresponding to four points surrounding the center of the diamond search;
determining whether there is a matching value satisfying a preset exit condition; and
if there is a matching value satisfying the preset exit condition:
verifying whether the radius of the diamond search is 1; and
if the radius of the diamond search is 1, regarding the motion vector of the point corresponding to the matching value satisfying the exit condition as the motion vector of the one calculating block; and
if the radius of the diamond search is not 1, setting the radius of the diamond search as 1, regarding the point corresponding to the matching value satisfying the exit condition as a new center of the diamond search, calculating matching values between the one calculating block and calculating blocks corresponding to the four points surrounding the new center of the diamond search, and regarding the motion vector of the point having the minimum matching value as the motion vector of the one calculating block; and
if there is not any matching value satisfying the preset exit condition regarding the point having the minimum matching value as a new center of the diamond search, calculating matching values between the one calculating block and calculating blocks corresponding to the four points surrounding the new center of the diamond search, and until there is a matching value satisfying the preset exit condition, repeatedly executing the following steps:
regarding the point having the minimum matching value as a new center of the diamond search, and
calculating matching values between the one calculating block and calculating blocks corresponding to the four points surrounding the new center of the diamond search;
wherein, the four points surrounding the center of a diamond search comprise four points which are on the top, bottom, left and right of the center of the diamond search respectively, with distance from the center of the diamond search being the radius of the diamond search.

2. The method of claim 1, wherein the radius of the diamond search is determined by:

determining a prediction value of the motion vector of the current macro block and a second threshold of the one calculating block in the one block pattern, and determining the radius of the diamond search based on the determined prediction value of the motion vector of the current macro block and the second threshold.

3. The method of claim 2, wherein the prediction value of the motion vector of the current macro block is the median of the motion vectors of a left macro block, a top macro block and a top-right macro block of the current macro block.

4. The method of claim 2, wherein the radius of the diamond search is further determined by:
setting the radius of diamond to 1 in the case that the determined prediction value of the motion vector of the current macro block is the same as the motion vector of any one of the left macro block, the top macro block and the top-right macro block of the current macro block, the motion vector of a calculating block in the previous frame image is not 0, and the determined second threshold of the one calculating block is less than a predetermined block motion threshold; otherwise, determining the radius of diamond to be 2;
wherein, the relative location between the calculating block in the previous frame and the previous frame is same with the relative location between the one calculating block in the current frame.

5. The method of claim 2, wherein determining the second threshold of the one calculating block comprises:
determining the second threshold of the one calculating block based on matching values between the one calculating block and calculating blocks corresponding to adjacent points in three directions of the one calculating block.

6. The method of claim 1, wherein determining the start point of the diamond search comprises:
calculating matching values between the one calculating block and each of the calculating blocks corresponding to the following motion vectors: the motion vector of a calculating block in the previous frame, motion vector (0, 0), the motion vector of the left macro block of the current macro block, the motion vector of the top macro block of the current macro block, and the motion vector of the top-right macro block of the current macro block; and regarding the point with the motion vector corresponding to the minimum matching value as the start point of the diamond search;
wherein, the relative location between the calculating block in the previous frame and the previous frame is same with the relative location between the one calculating block in the current frame.

7. The method of claim 1, wherein the predetermined reset exit condition is: the block matching value is less than a pre-determined first threshold.

8. The method of claim 7, wherein determining the first threshold comprises:
determining the first threshold based on matching values between the one calculating block and calculating blocks corresponding to adjacent points in three directions of the one calculating block.

* * * * *